2,980,645
Patented Apr. 18, 1961

2,980,645

ULTRAVIOLET LIGHT PROTECTED POLY-α OLEFIN COMPOSITIONS

Gordon C. Newland and John W. Tamblyn, Kingsport, Tenn., assignors to Eastman Kodak Company, Rochester, N.Y., a corporation of New Jersey No Drawing. Filed May 20, 1959, Ser. No. 814,394

5 Claims. (Cl. 260—45.75)

This invention relates to the stabilization of poly-α-olefin compositions. Preferred embodiments of the invention relate to the stabilization of polyethylene and polypropylene compositions against deterioration resulting from exposure to sunlight or ultra-violet light with novel synergistic stabilizer combinations.

Poly-α-olefins such as polyethylene, polypropylene and the like are subject to photo-oxidation when exposed to sunlight. This oxidation is characterized in its earlier stages by the breaking of the polymer chain and the formation of carbonyl groups. As the oxidation continues, the polymer cracks and loses tensile strength to the point of mechanical failure. A number of so-called ultra-violet inhibitors are known which inhibit the photo-degradation of many polymers, resins or plastics. However, many effective stabilizers for halogen-containing polymers, for example, such as polyvinyl chloride, polyvinylidene chloride and the like are not effective stabilizers in poly-α-olefins as stabilizers in halogen-containing polymers function essentially as hydrogen halide scavengers while stabilizers in halogen-free poly-α-olefins do not serve this function. Likewise, ultraviolet inhibitors which are eminently suited for such cellulosic esters as cellulose triacetate, cellulose acetate butyrate and the like are not necessarily effective ultraviolet inhibitors for poly-α-olefins because of the inherently different nature of poly-α-olefins. Hence, it is highly unpredictable as to whether a given ultraviolet inhibitor compound will be effective in poly-α-olefin compositions.

At least as unpredictable is the determination of whether or not a given combination of two or more stabilizer compounds will synergize to produce a stabilizing effect in poly-α-olefins that is greater than the additive effect of the individual stabilizers. There are hundreds of stabilizer pairs that do not synergize. We know of no method whereby a combination of stabilizers can be predicted to be synergistic stabilizers for poly-α-olefin compositions short of actually testing the combination, even though the individual components comprising the combination may be well-known stabilizers for various polymers, resins or plastics, including poly-α-olefin compositions.

Apart from the fact that it is an unexpected scientific discovery when two stabilizers are found that will synergize with each other in poly-α-olefin compositions, there are certain practical advantages that often times accompany the use of such a combination of stabilizers as distinguished from the use of a single stabilizer material or compound. For example, one of the stabilizers of the combination might be costly or difficult to acquire in commercial amounts while the other stabilizer of the combination might be relatively cheap and readily available. In such a situation it would be desirable to be able to substitute the cheaper stabilizer for a portion of the more expensive stabilizer, and still be able to obtain good stabilization through the synergism of the stabilizer combination. In addition, one of the stabilizers of a combination that synergizes with another stabilizer to produce improved resistance to deterioration from ultraviolet light might also serve as an effective stabilizer against odor formation or degradation due to high temperature processing methods or to uses of poly-α-olefin compositions at high temperatures. Thus, it is highly desirable in the poly-α-olefin art to have available synergistic combinations of two or more stabilizers.

It is an object of this invention to provide new synergistic combinations of stabilizers for poly-α-olefin compositions.

It is another object of this invention to provide novel polyethylene and polypropylene compositions containing synergistic combinations of compounds that improve the stability of the polyethylene and polypropylene compositions against deterioration resulting from exposure to sunlight or ultraviolet light.

It is also an object of this invention to provide novel poly-α-olefin compositions of improved stability at elevated temperatures.

Other objects of the invention will be apparent from the description and claims that follow.

The present invention comprises poly-α-olefin compositions having incorporated therein a stabilizer combination comprising a zinc N,N'-dialkylthiocarbamate and a 2-hydroxy-4,4'-dialkoxybenzophenone. This combination of stabilizers imparts to poly-α-olefin compositions a high degree of stability to deterioration resulting from exposure to ultraviolet light, and which improved stability is substantially greater than the additive effect of the individual stabilizers comprising the subject stabilizer combination. Hence, the stabilizer combination of the invention is termed in the art a "synergistic" combination.

The zinc N,N'-dialkyldithiocarbamate component of the subject stabilizer combination has the following formula:

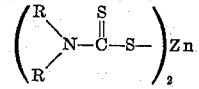

wherein R is an alkyl group and desirably a lower alkyl group containing 1 to 8 carbon atoms. The preferred stabilizer has four carbon atoms for the alkyl substituent, namely, zinc N,N'-di-n-butyldithiocarbamate, although other zinc N,N'-dialkyldithiocarbamates having such alkyl substituents as methyl, ethyl, propyl, isopropyl, isobutyl, n-amyl, n-hexyl, n-octyl etc., or admixtures thereof, can be employed in the subject stabilizer combination. Zinc N,N'-dialkyldithiocarbamates are described in Tholstrup and Tamblyn application U.S. Serial No. 670,375, filed July 8, 1957, as effective heat stabilizers for poly-α-olefin compositions. Thus, the present combination of stabilizers not only lends to poly-α-olefin compositions improved resistance to ultraviolet light, but also resistance to elevated temperatures.

The 2-hydroxy-4,4'-dialkoxybenzophenone component of the subject stabilizer combination has the following formula:

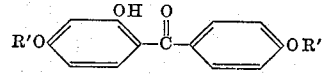

wherein R' is an alkyl radical, usually having 1 to 8 carbon atoms and desirably 1 to 4 carbon atoms. Suitable alkyl substituents for the 2-hydroxy-4,4'-dialkoxybenzophenone include methyl, ethyl, propyl, isopropyl, n-butyl, t-butyl, n-amyl, n-hexyl, n-octyl etc., or admixtures thereof.

The combination of the subject zinc N,N'-dialkyldithiocarbamates and 2-hydroxy-4,4'-dialkoxybenzophenones can be used to stabilize a wide variety of poly-α-olefin compositions against deterioration resulting from exposure to ultraviolet light. Any of the normally solid polymers of α-monoolefinic aliphatic hydrocarbons containing 2 to 10 carbon atoms can be stabilized in accordance with the invention. The subject stabilizer combination is preferably used in polyethylene and polypropylene, although such poly-α-olefins as poly 4-methylpentene-1, poly 3-methylbutene-1, poly 3,3-dimethyl-butene-1, poly pentene-1, poly decene-1 and related homologues are included in the invention. Both the so-called "low density" and "high density" poly-α-olefin compositions can be stabilized in accordance with the invention. Reference is made to Fawcett et al. U.S. Patent No. 2,153,553, granted April 11, 1939, and to applications Coover U.S. Serial No. 559,536, filed January 17, 1956, now abandoned, and Coover et al. U.S. Serial No. 724,904, filed March 31, 1958, with regard to the preparation of various poly-α-olefin compositions that can be stabilized against ultraviolet deterioration with the subject stabilizer combination. The subject stabilizer combination can be used as an ultraviolet inhibitor for the more common solid resinous poly-α-olefin compositions having average molecular weights of at least 15,000 and more usually at least 20,000, as well as the so-called poly-α-olefin waxes having lower molecular weights, usually 3,000–12,000.

The amount of the combination of the subject zinc N,N'-dialkyldithiocarbamates and 2-hydroxy-4,4'-dialkoxybenzophenones employed in poly-α-olefin compositions in accordance with the invention can be widely varied, the stabilizing amount of this combination usually varying with the particular use to which the poly-α-olefin is to be put. Concentrations of the combination of at least .001% are used, with concentrations of .001% to 10% being generally used, and with concentrations of .005% to 5% being preferably used, the concentration being based on the weight of the poly-α-olefin. The weight ratios of the stabilizers comprising the subject synergistic combination likewise can be varied. We prefer to utilize the combination of the subject stabilizers at weight ratios of zinc N,N'-dialkyldithiocarbamate to 2-hydroxy-4,4'-dihydroxybenzophenone ranging from 1/30 to 30/1, and preferably 1/10 to 10/1.

The stabilizer combinations of the invention can be incorporated or blended into poly-α-olefin compositions by any of the conventional methods used for blending such materials into resins or plastics. Typical of such methods that can be suitably employed include milling on heated rolls, deposition from solvents, and dry-blending. The stabilizers of the invention can be incorporated separately or together into the poly-α-olefin composition.

The stabilizer combinations of the present invention lend to poly-α-olefin compositions improved stability, and more specifically, improved stability against deterioration resulting from exposure to sunlight or ultraviolet light. Thus, poly-α-olefins stabilized in accordance with the invention have an extended life expectancy and can be used more effectively than unstabilized poly-α-olefins for a wide diversity of uses, including outdoor uses requiring prolonged exposure to the elements. Poly-α-olefin stabilized in accordance with the invention can be cast, extruded, rolled or molded into sheets, rods, tubes, piping, filaments and other shaped articles. The present compositions can be used for coating paper, wire, metal foil, glass fiber fabrics, synthetic and natural textiles and other such materials. Likewise, small amounts of other additives such as other polymers, resins or plastics, as well as other stabilizers or inhibitors, that are commonly added to poly-α-olefins for specific uses are not deleterious to the effectiveness of the present synergistic combination.

The invention is illustrated by the following examples of preferred embodiments thereof.

EXAMPLE 1

Polypropylene samples containing 1% by weight of 2-hydroxy-4,4'-dimethoxybenzophenone plus 2% by weight of zinc N,N'-di-n-butyldithiocarbamate, as well as these two stabilizers individually at a level of 3% by weight and a control containing no stabilizer additive, were subjected to artificial weathering. The additives were incorporated into polypropylene having an average molecular weight of about 126,000 and a density of .917 by milling on heated rollers in accordance with usual practice. The polypropylene compositions were injection molded into 1/16 inch thick samples. The prepared samples were exposed in an Atlas Twin-Arc Weather-Ometer as described in Anal. Chem., 25, 460 (1953) that was modified by the addition of 10 Westinghouse 20 watt sunlamps. Exposure damage to the samples was assessed by the physical appearance of the exposed samples and by determining the percent of original elongation retained after 700 hours of exposure to the artificial weathering. The elongation measurements were made on 2.5 x .5 inch test strips with an Instron tensile tester at a rate of stretch of 2,000% per minute. The test samples were conditioned one week at 73° F. at a relative humidity of 50%. The results of the tests are summarized by the data set out in the table below.

Table

| Additive | Percent Original Elongation Left After 700 Hours' Exposure | Appearance of Surface After 700 Hours' Exposure |
| --- | --- | --- |
| (1) None | 7 | Rough, crumbly. |
| (2) 3% Zinc N,N'-di-n-butyldithiocarbamate. | 10 | Powdery. |
| (3) 3% 2-Hydroxy-4,4'-dimethoxy-benzophenone. | 59 | Slightly powdery. |
| (4) 2% Zinc N,N'-di-n-butyldithiocarbamate+1% 2-Hydroxy-4,4'-dimethoxybenzophenone. | 80 | Smooth, tough. |

As can be seen from the data set out in the above table, zinc N,N'-di-n-butyldithiocarbamate and 2-hydroxy-4,4'-dimethoxybenzophenone cooperate to lend to polypropylene a resistance to ultraviolet light degradation that is greater than that resulting from these two additives individually.

EXAMPLE 2

A 2% by weight portion of zinc N,N'-di-n-butyldithiocarbamate in combination with a 1% by weight portion of 2-hydroxy-4,4'-dimethoxybenzophenone incorporated into polyethylene having an average molecular weight of about 30,000 and a density of .918, when prepared in test samples and exposed to artificial weathering as described in Example 1, show a synergistic effect in stabilizing the polyethylene against deterioration resulting from the exposure.

The present invention thus provides novel poly-α-olefin compositions having improved stability against deterioration resulting from exposure to ultraviolet light, and particularly it provides novel and useful synergistic stabilizer combinations for poly-α-olefin compositions.

Although the invention has been described in detail with reference to preferred embodiments thereof, it will be understood that variations and modifications can be effected within the spirit and scope of the invention as described hereinabove and as defined by the appended claims.

We claim:

1. A solid poly-α-olefin composition comprising polyethylene containing .005% to 5% by weight based on said polyethylene of a stabilizer combination comprising zinc N,N'-dibutyldithiocarbamate and 2-hydroxy-4,4'-dimethoxybenzophenone, the weight ratio of said zinc N,N'-dibutyldithiocarbamate to said 2-hydroxy-4,4'-dimethoxybenzophenone being in the range of 1/10 to 10/1.

2. A solid poly-α-olefin composition comprising polypropylene containing .005% to 5% by weight based on said polypropylene of a stabilizer combination comprising zinc N,N'-dibutyldithiocarbamate and 2-hydroxy-4,4'-dimethoxybenzophenone, the weight ratio of said zinc N,N'-didibutyldithiocarbamate to said 2-hydroxy-4,4'-dimethoxybenzophenone being in the range of 1/10 to 10/1.

3. A solid poly-α-olefin composition comprising polyethylene having an average molecular weight of at least 15,000 containing about 2% by weight based on said polyethylene of zinc N,N'-di-n-butyldithiocarbamate and about 1% by weight based on said polyethylene of 2-hydroxy-4,4'-dimethoxybenzophenone.

4. A solid poly-α-olefin composition comprising polypropylene having an average molecular weight of at least 15,000 containing about 2% by weight based on said polypropylene of zinc N,N'-di-n-butyldithiocarbamate and about 1% by weight based on said polypropylene of 2-hydroxy-4,4'-dimethoxybenzophenone.

5. A solid poly-α-olefin composition comprising a poly-α-olefin selected from the group consisting of polyethylene and polypropylene containing .001% to 10% by weight based on said poly-α-olefin of a stabilizer combination comprising zinc N,N'-dibutyldithiocarbamate and 2-hydroxy-4,4'-dimethoxybenzophenone, the weight ratio of said zinc N,N'-dibutyldithiocarbamate to said 2-hydroxy-4,4'-dimethoxybenzophenone being in the range of 1/30 to 30/1.

References Cited in the file of this patent
UNITED STATES PATENTS

| | | |
|---|---|---|
| 2,765,292 | Groff et al. | Oct. 2, 1956 |
| 2,773,903 | Hardy et al. | Dec. 11, 1956 |
| 2,789,962 | Groff et al. | Apr. 23, 1957 |